CYCLOHEPTATRIENE

ALKYL:  (S = SATURATED)

ARALKYL:

ARYLARALKYL

ALKENE:

$-CH_2-CH=CH-CH_2-$ ,  $-CH_2-CH=C-CH_3$ ,  $-CH=CH-CH=CH-$ ,
$\qquad\qquad\qquad\qquad\qquad\quad |$

POLYMERIC:

(WHERE n MAY BE FROM 1 to 50)

BICYCLIC:

INVENTORS
PERRY A. ARGABRIGHT
C. TRAVIS PRESLEY
RONALD E. SMITH 3,789,010
GEL COMPOSITION
C. Travis Presley, Littleton, Perry Argabright, Larkspur, and Ronald E. Smith, Littleton, Colo., assignors to Marathon Oil Company, Findlay, Ohio
Filed Aug. 23, 1971, Ser. No. 173,759
Int. Cl. B01j *13/00*
U.S. Cl. 252—316
6 Claims

ABSTRACT OF THE DISCLOSURE

A gel composition sufficiently stable to support its own weight having elasticity and cohesive character produced by reacting at a pH above 7, an alkali metal hydroxide or alkaline earth metal hydroxide with a compound which contains polyisocyanurate salt groups, trisubstituted isocyanurate rings and end groups selected from: isocyanate, urethane, urea and amino groups, in the presence of hydroxyethyl cellulose.

CROSS REFERENCES TO RELATED APPLICATIONS

The following U.S. Patent application relates to compounds and uses which are generally related to the present invention: Ser. No. 173,892, filed Aug. 23, 1971.

BACKGROUND OF THE INVENTION

Field of the invention

The present invention relates generally to the field of isocyanurate-containing organic compositions generally classified with Class 260, subclasses —248 and —88.3 of the United States Patent Office, and to organic gels generally classified in Class 252—316.

Description of the prior art

The production of gels from systems containing water, hydroxyethyl cellulose and metal salts of alginic acid has been described, together with other properties of hydroxyethyl cellulose, in "Water-Soluble Resins" ed. Robert L. Davidson and Marshall Sittig, 2nd edition, Reinhold Book Corporation (1968), particularly at page 83.

SUMMARY OF THE INVENTION

General statement of the invention

The present invention relates to a new class of compositions which are useful as gels, e.g., in forming plugs such as for pipe line separation pigs etc. These compositions are produced by contacting hydroxyethyl cellulose with a compound characterized by containing in a single molecule the following groups:

metal isocyanurate,

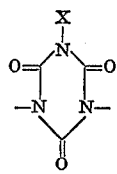

with or without isocyanurate,

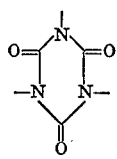

The gelling agents of the present invention have the advantage of giving a controllable time to onset of gelation. That is, by merely adjusting the pH of the initial solution, the gelation time may be controlled, a feature not available with conventional systems.

The isocyanurate compounds of the present invention have the general structure shown in FIG. 1;

where:

R=divalent hydrocarbon or substituted hydrocarbon radical as described below and exemplified in FIG. 2.

X=a metal, or hydrogen or quaternary ammonium (which, for the purposes of this invention, acts like a metal) or a combination thereof. Particularly preferred are hydrogen, quaternary ammonium and metals selected from the following groups of the Periodic Table; Ia, Ib, IIa, IIb, IIIa, IIIb, IVa, IVb, Va, Vb, VIa; including such metals as Li, Na, K, Rb, Cs, Ag, Au, Be, Mg, Ca, Sr, Ba, Ra, Zn, Cd, Hg, B, Al, Sc, Y, La, and the other rare earths, Ac, Ga, In, Tl, Ti, Zr, Hf, Ge, Sn, Pb, V, Nb, Ta, Sb, Bi, Cr, Mo, W, Mn, Fe, Ru, Co, Ni, Rh, Pd, Os, and Ir.

A=a monovalent organic radical selected from the following: isocyanate (—NCO), urethane (—NHCO$_2$R'), urea (—NHCONHR'), amino (—NH$_2$), —NHR', —NR$_2$', or R', for example.

R'=monovalent hydrocarbon or substituted hydrocarbon radical, as discussed below;

$m$=average number of trisubstituted isocyanurate rings and is a positive number from 0 to about 400, and most preferably from 0 to about 200.

$n$=average number of isocyanuric acid and/or isocyanurate salt groups and is a positive number from above 1 to about 10,000, more preferably from 2 to about 1000, and most preferably from 3 to about 100.

$2m+n+1$=average number of divalent R groups and is a positive integer from 2 to about 11,000, more preferably from 3 to about 1,100 and most preferably from 4 to about 140.

$m+2$=average number of A groups and is a positive integer from 2 to about 2,000, more preferably from 2 to about 400 and most preferably from 2 to about 200;

and wherein there are no N— to —N bonds and no A— to —N bonds and no A— to —A bonds and no R— to —R bonds.

R preferably contains 2 to 40, more preferably 2 to 30, and most preferably 2 to 18 carbon atoms.

R' preferably contains 1 to 40 carbon atoms, more preferably 1 to 20 carbon atoms and most preferably 1 to 10 carbons, for example, —CH$_3$, —C$_2$H$_5$, —C$_3$H$_7$, i—C$_3$H$_7$—,

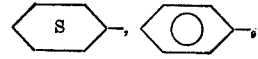

—CH$_2$CH$_2$OH,

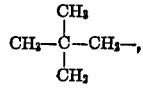

CH$_2$=CH—CH$_2$—,

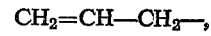

etc.

R and/or R' can be substituted with groups that do not interfere in the products' subsequent utility or in its preparation. Examples of such noninterfering groups are: —NO$_2$, Cl, F, Br, I, CN, —CO$_2$R", —CO—R", —O—R", —SR", —NR$_2$", —CONR$_2$", —SO$_3$R, SO$_2$R"—, —SOR"—, phenyl, naphthyl, alkyl (1–40 carbon atoms), —PO$_3$R", cyclohexyl, cyclopropyl,

—OCOR"

etc. where R'' may be hydrogen, lower alkyl (e.g., ethyl, hexyl) or aryl (e.g. monovalent radicals corresponding to the aryl radicals described in FIG. 2. The examples of R (shown in FIG. 2) are set forth for purposes of elucidation, not restriction.

It will be recognized that the values of $m$ and $n$ described above are on the basis of the integers which will be used to describe a single molecule. In actual practice, the invention will involve mixtures of molecules of the general form described above. Thus, the average value of $m$ for the mixture may be from about 1 to about 2000, more preferably from about 1 to 400, and most preferably from about 1 to 200; the average value of $n$ may be from about 0.5 to 10,000, more preferably from about 0.5 to 1000, and most preferably from about 0.5 to 100.

Utility of the invention

The present invention relates to a new and novel class of gels, their preparation, and processes for their use. For example, the compositions of the present invention can be used as gels in pipe line separation devices, e.g., according to the techniques of U.S. Pats. 3,473,572; 3,225,787 and 3,209,771, and in electrophoresis gels such as those taught in U.S. Pat. 3,576,727. Other uses include: cast films, encapsulating media, e.g., for electronic devices, molds, fillers for water beds and other filled plastic flexible envelopes, etc.

DESCRIPTION OF THE PREFERRED EMBODIMENTS

Figure 1:
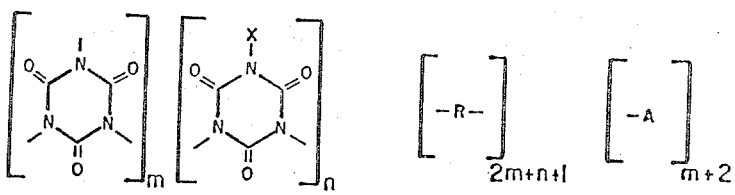
FIG. 1 shows the general formula of the organic starting materials of the present invention.
Figure 3:
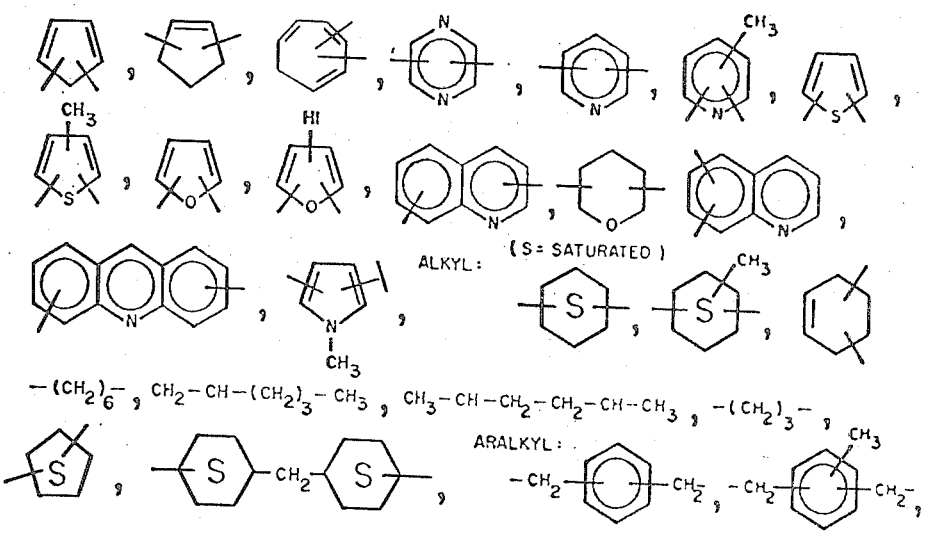
FIGS. 2 and 3 exemplify some of the possible structures of R groups of the starting materials and products of the present invention.
Figure 3:
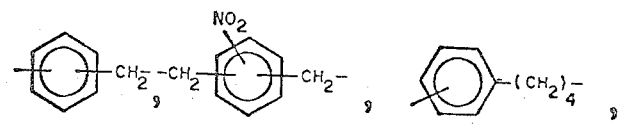
Figure 3:
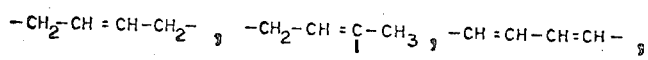
Figure 3:
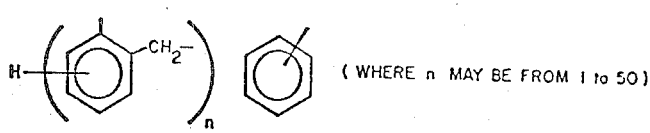
Figure 3:
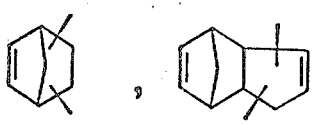
Figure 2:
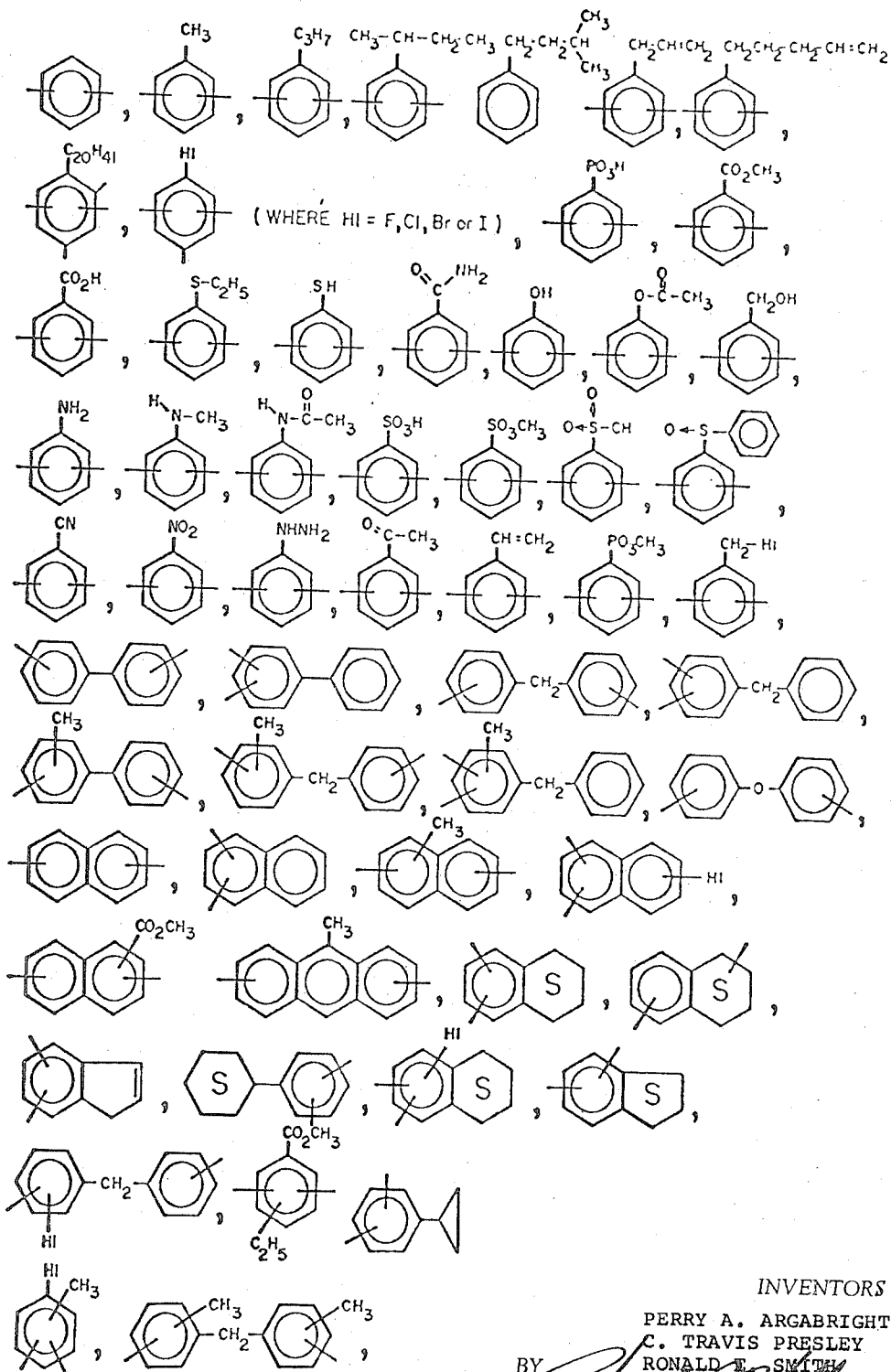

It has been discovered that aqueous solutions of the aforementioned polyisocyanurate salts, of the general formula shown in FIG. 1, (where the lettered groups are as described above under "Summary of the Invention"), when contacted with hydroxyethyl cellulose under basic conditions, (i.e., pH in excess of 7) give the gels of the present invention.

Starting materials

The starting materials for the present invention are:

Salts of polyisocyanuric acids.—These are produced according to the techniques taught in copending U.S. Pat. 3,573,259, by reacting a metal cyanate and an organic diisocyanate in the presence of an aprotic solvent to form isocyanurate-containing polyisocyanate metal salts. Preferably 0.3 to about 50% by weight, more preferably 0.5 to about 25% by weight, and most preferably 1.0 to about 10% by weight of polyisocyanurate salts will be used in the aqueous solution.

Hydroxyethyl cellulose.—The hydroxyethyl cellulose used in the present invention can be of commercial quality such as that marketed by Hercules Powder Company of Wilmington, Delaware, and described in its brochure 855 6M 7-63 "Natrosol" Hydroxyethylcellulose. In general, about 0.15 to about 20, more preferably 0.20 to about 15, and most preferably 0.25 to about 3% by weight of hydroxyethyl cellulose will be mixed with the aforementioned isocyanurate salt starting materials. In general, high molecular weight HEC will require less HEC for gelation.

Bases.—While not narrowly critical, the bases employed with the present invention will preferably be alkali metals, metal hydroxides, e.g., NaOH, KOH, LiOH, and alkaline earth metal hydroxides, e.g., Ca(OH)$_2$, etc. The alkali metal hydroxides will be more preferred, with sodium hydroxide being the most preferred of the bases. In general, the pH will be adjusted into a range above 7, more preferably from about 7.5 to about 15, and most preferably from about 12 to about 15.

Reaction Media.—Water or mixtures of water and an alcohol, ketone, ester, amide, sulfoxide, sulfone, etc.

Temperature.—While not narrowly critical, temperatures in the range from 0 to about 65° C. are preferred, with 10 to 50° C. being more preferred and 15–40° C. being most preferred. The lower limit is generally the freezing point of the solution and the upper limit is generally the thermal instability point of the gel at the reaction pressure.

Pressure.—While not narrowly critical, the reaction can be carried out at pressures of from 0.5 to 100, with 0.6 to 50 being more preferred, and 0.7 to 10 atmospheres being most preferred.

Time.—The reaction time, of course, is dependent on the initial concentration of the starting materials and the temperature. The preferred time is from 0.01 to 4500 hours, more preferred 0.05 to 350 hours, and most preferred from 0.06 to 200 hours.

EXAMPLE I

Preparation of polyisocyanurate salt

To a stirred slurry of 82.4 KOCN (1.02 mole) in 2000 ml. of dimethylformamide (DMF) at 75° C., 161 g. of tolylene diisocyanate (0.93 mole) is added at a rate of 0.42 ml./min. by means of a syringe pump.

The entire operation is carried out in a nitrogen atmosphere. Following the addition, the reaction mixture is stirred an additional 5 minutes, dry methanol added (large excess) and allowed to react for an additional hour to insure complete quenching. The major product is insoluble in DMF and thus readily separated by a single filtration. A trace DMF soluble product is obtained after solvent stripping the filtrate. After vacuum drying at 80° C. to remove residual DMF and methanol, the following yield and analytical data are obtained:

| Product | Percent yield [1] | Aryl/end group [2] ratio (2m+n+1/ m+2) | Average Mol. wt. (minimum) |
|---|---|---|---|
| DMF insoluble [3] | 93.3 | 17.0 | 8,000 |
| DMF soluble | 6.3 | 1.9 | 950 |

[1] Corrected for residual DMF.
[2] Measured by nuclear magnetic resonance spectroscopy.
[3] Contains 12.1% DMF of solvation.

| Example | Percent by weight | | | Remarks |
|---|---|---|---|---|
| | HEC [1] | NaOH | PI | |
| II | 1.8 | 4 | 2 | Translucent gel. |
| III | 1 | 4 | 2 | Opaque gel; sl. shrinkage. |
| IV | 1 | 4 | 1 | Opaque gel. |
| V | 1 | 4 | 0.50 | Translucent gel. |
| VI | 1 | 2 | 0.25 | Do. |
| VII | 0.25 | 2 | 0.25 | Transparent gel; 25% shrinkage. |

[1] HEC=Hydroxyethyl cellulose (Natrosal 250 Hercules Powder).

EXAMPLES VIII–XI

When the following examples were conducted according to the techniques of the preceding examples, in each case no gel was formed. These examples serve to indicate the unexpectedness of the gelation property of the compositions of the present invention.

| Example | Percent by weight | | | Remarks |
|---|---|---|---|---|
| | HEC[1] | NaOH | PI | |
| VIII | 1.8 | 4 | 0 | No gelation. |
| IX | 0.75 | 0 | 2 | Do. |
| X | 1.0 | 0 | 1 | Do. |
| XI | 0.125 | 4 | 3 | Do. |

[1] HEC=Hydroxyethyl cellulose (Natrosal 250 Hercules Powder).

Modifications of the invention

It should be understood that the invention is capable of a variety of modifications and variations which will be made apparent to those skilled in the art by a reading of the specification and which are to be included within the spirit of the claims appended hereto.

What is claimed is:

1. A gel composition substantially insoluble in water prepared by reacting at a pH above 7, an alkali metal hydroxide or alkaline earth metal hydroxide with a compound containing metal isocyanurate groups, in the presence of hydroxyethyl cellulose wherein there are present 0.2 to about 50% by weight of said isocyanurate salt compound, and from 0.15 to about 20% by weight of said hydroxyethyl cellulose said compound containing isocyanurate groups having the general structure:

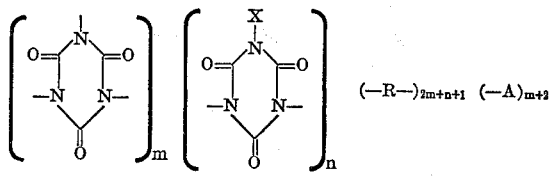

wherein
R is a divalent hydrocarbon radical or hydrocarbon radical substituted with groups selected from the class consisting of —NO$_2$, Cl, F, Br, I, CN, CO$_2$R″, NR″$_2$, —CONR″$_2$, —SO$_3$R″, —SO$_2$R″, —SOR″, phenyl, naphthyl, alkyl (1–40 carbon atoms),

—PO$_3$R″ cyclohexyl cyclopropyl, —OCOR″,

where R″ is hydrogen, lower alkyl or monovalent radical corresponding to the aryl radicals described below:

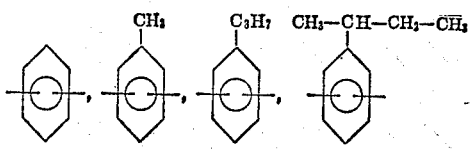

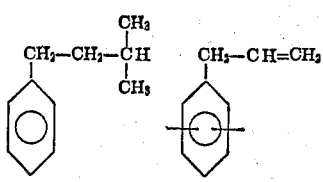

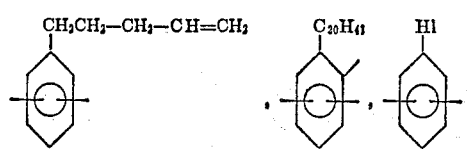

(where Hl=F, Cl, Br or I),

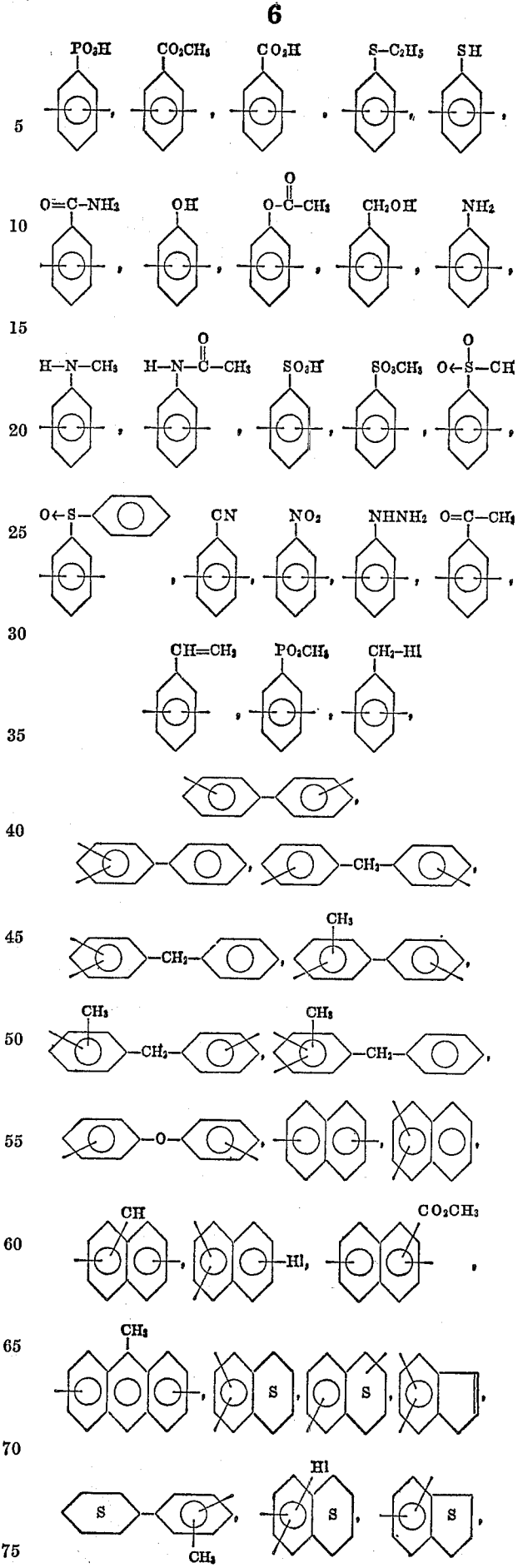

3,789,010

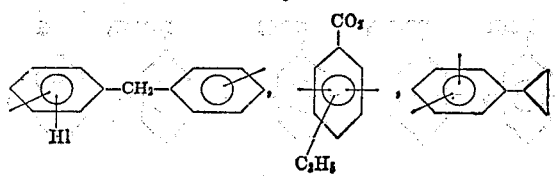

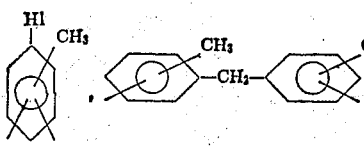

X is selected from the group consisting of metals, hydrogen, and quaternary ammonium radicals, A is a monovalent organic radical selected from the group consisting of —NCO, —NHCO$_2$R′, —NHCO NHR′, —NH$_2$, —NHR′, —NR$_2$, and R′

R′ is a monovalent hydrocarbon radical or hydrocarbon radical substituted with groups selected from the class consisting of: NO$_2$, Cl, F, Br, I, CN, —CO$_2$ R″, —CO—R″, —O—R″, —SR″, NR″$_2$, —CONR″$_2$, —SO$_3$R″, —SO$_2$R″, —SOR″, phenyl, naphthyl, alkyl (1–40) carbon atoms), —PO$_3$ R″, cyclohexyl cyclopropyl, —OCOR″, $$-\overset{H}{\underset{|}{N}}COR''$$

where R″ is hydrogen, lower alkyl or monovalent radical corresponding to the aryl radicals described above;

*m* is the average number of trisubstituted isocyanurate rings per molecule and is a positive number from zero to about 400,

*n* is the average number of isocyanurate acid and/or isocyanurate salt groups and is a positive number from about 1 to about 10,000, wherein, $2m+n+1$ =the average number of divalent R groups and is a positive integer from 2 to about 11,000, and wherein $m+2$ is the average number of A groups and is a positive integer from 2 to about 2,000, and wherein there are no N—to—N bonds and no A—to—N bonds, and no A—to—A bonds and no R—to—R bonds.

2. A composition according to claim 1 wherein R is selected from the group of organic radicals shown in the following structure:

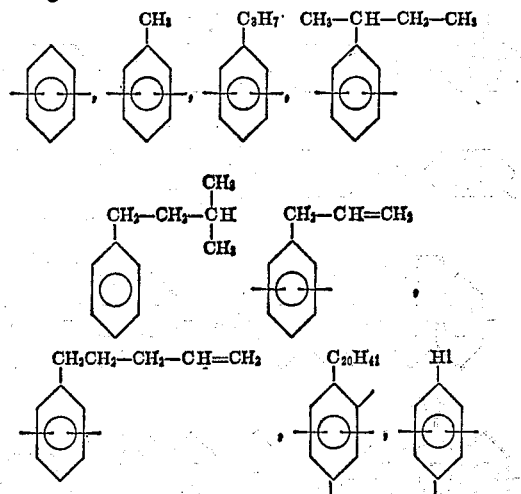

where Hl=F, Cl, Br or I,

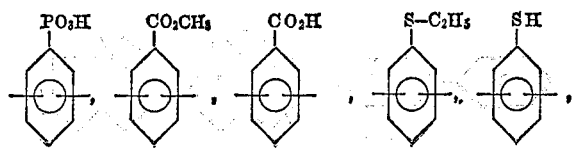

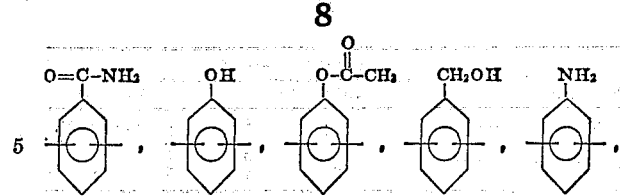

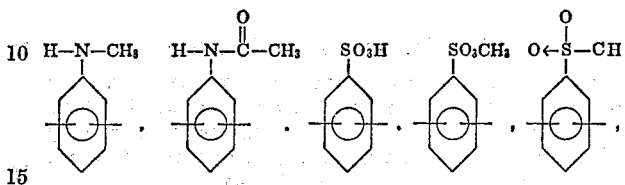

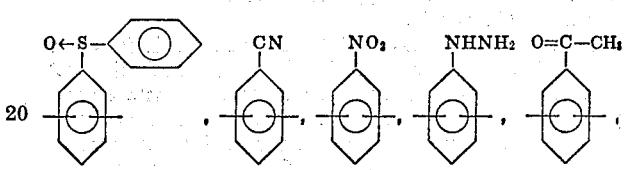

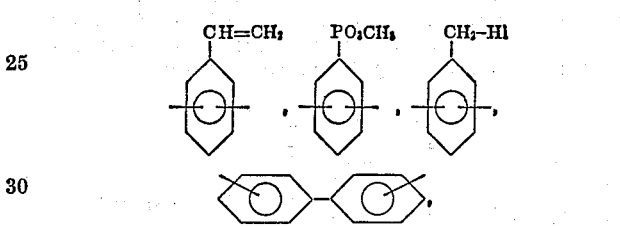

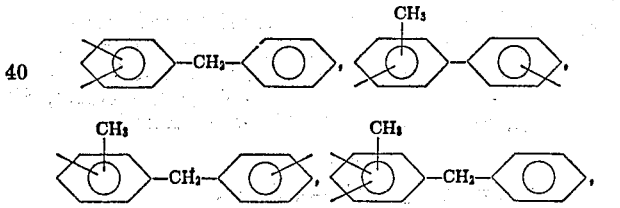

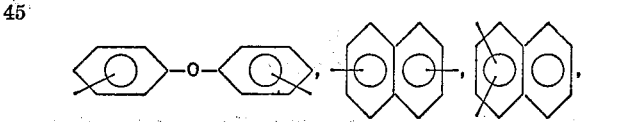

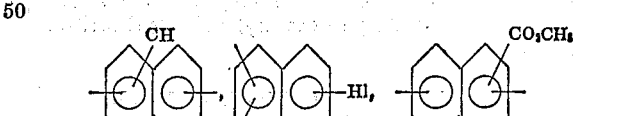

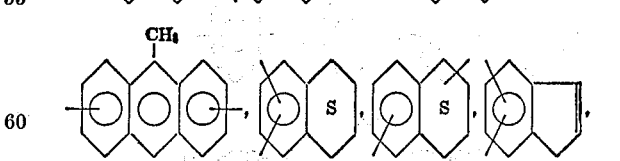

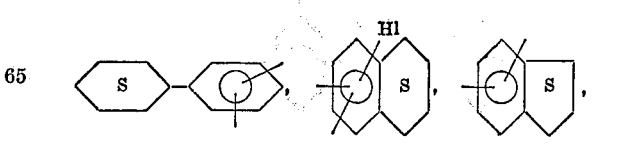

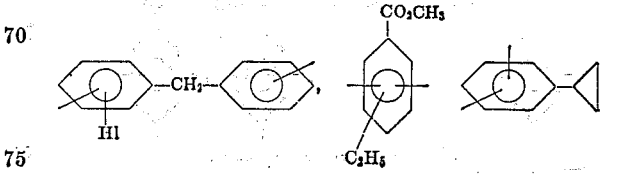

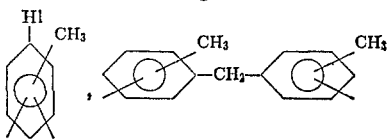

and wherein the substituted hydrocarbons are selected from hydrocarbon radicals substituted with groups selected from the class consisting of: $-NO_2$, Cl, F, Br, I, CN, $-CO_2R''$, $-CO-R''$, $-O-R''$, $-SR''$, $-NR_2''$, $-CONR_2''$, $-SO_3R''$, $SO_2R''$, $-SOR''$, phenyl, naphthyl, alkyl (1–40 carbon atoms), $-PO_3R''$, cyclohexyl, cyclopropyl, $-OCOR''$,

where $R''$ is hydrogen, lower alkyl or monovalent radicals corresponding to the aryl radicals described in the structure above.

3. Composition according to claim 1 wherein X is selected from the group consisting of hydrogen, quaternary ammonium radicals and metal radicals selected from the following groups of the Periodic Table; I*a*, I*b*, II*a*, II*b*, III*a*, III*b*, IV*a*, IV*b*, V*a*, V*b*, VI*a*.

4. Composition according to claim 1 wherein *m* is a positive integer from 0 to about 200, wherein *n* is a positive integer from 3 to about 100, and wherein $2m+n+1$ is a positive integer from 4 to about 140, and wherein $m+2$ is a positive integer from about 2 to about 200.

5. Composition according to claim 1 wherein R′ contains from 1 to 10 carbon atoms and is selected from the group consisting of $-CH_3$, $-C_2H_5$, $-C_3H_7$, i-$C_3H_7-$,

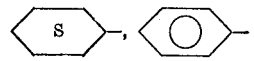

$-CH_2CH_2OH$,

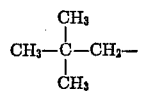

$CH_2=CH-CH_2-$,

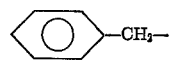

6. Composition according to claim 1 wherein X is selected from the group consisting of: Li, Na, K, Rb, Cs, Ag, Au, Be, Mg, Ca, Sr, Ba, Ra, Zn, Cd, Hg, B, Al, Sc, Y, La, and the other rare earths, Ac, Ga, In, Tl, Ti, Zr, Hf, Ge, Sn, Pb, V, Nb, Ta, Sb, Bi, Cr, Mo, W, Mn, Fe, Ru, Co, Ni, Rh, Pd, Os, and Ir.

References Cited
UNITED STATES PATENTS

| | | | |
|---|---|---|---|
| 2,253,297 | 8/1941 | Houghton et al. | 252—316 X |
| 3,573,259 | 3/1971 | Argabright et al. | 260—77.5 NC |
| 3,037,979 | 6/1962 | Fukui et al. | 106—176 X |
| 3,134,720 | 5/1964 | Green et al. | 252—316 X |

RICHARD D. LOVERING, Primary Examiner

U.S. Cl. X.R.

106—176; 137—561 R, 802; 204—299

UNITED STATES PATENT OFFICE
CERTIFICATE OF CORRECTION

Patent No. 3,789,010  Dated January 29, 1974

Inventor(s) C. T. Presley et al

It is certified that error appears in the above-identified patent and that said Letters Patent are hereby corrected as shown below:

Col 1, line 32: Delete "with Class" and insert --within Class--.

Col. 2, line 56: Delete:

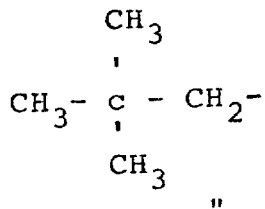

and insert:

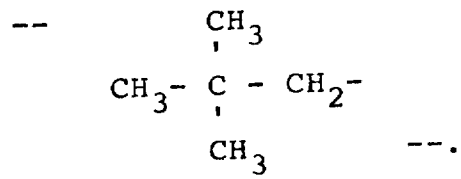

Col. 2, line 68: Delete "SO$_3$R"-" and insert: -- -SO$_2$R"- --.

Col. 3, line 54: Delete "0.3" and insert --0.2--.

Col. 6, line 20: Delete 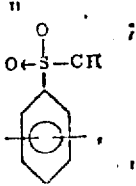 ; insert:-- 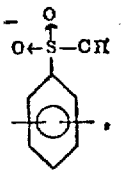 --.

Signed and sealed this 12th day of November 1974.

(SEAL)
Attest:

McCOY M. GIBSON JR.
Attesting Officer

C. MARSHALL DANN
Commissioner of Patents